(12) United States Patent
Momosaki

(10) Patent No.: US 7,929,615 B2
(45) Date of Patent: Apr. 19, 2011

(54) VIDEO PROCESSING APPARATUS

(75) Inventor: Kohei Momosaki, Mitaka (JP)

(73) Assignee: Kabushiki Kaisha Toshiba, Tokyo (JP)

(*) Notice: Subject to any disclaimer, the term of this patent is extended or adjusted under 35 U.S.C. 154(b) by 57 days.

(21) Appl. No.: 12/503,777

(22) Filed: Jul. 15, 2009

(65) Prior Publication Data

US 2010/0013999 A1 Jan. 21, 2010

(30) Foreign Application Priority Data

Jul. 15, 2008 (JP) .................................. 2008-184057

(51) Int. Cl.
*H04B 1/66* (2006.01)
(52) U.S. Cl. .................................. 375/240.26
(58) Field of Classification Search ......... 375/240.12–240.26, 240.29; 348/158–160, 14.02, 155; 340/541; *H04B 1/66*
See application file for complete search history.

(56) References Cited

U.S. PATENT DOCUMENTS

| | | | | |
|---|---|---|---|---|
| 6,937,271 B1* | 8/2005 | Mori et al. | ............... | 348/207.99 |
| 7,460,178 B2* | 12/2008 | Kondo et al. | ................. | 348/576 |
| 2009/0226038 A1* | 9/2009 | Takei | ............................ | 382/103 |
| 2009/0228922 A1* | 9/2009 | Haj-khalil et al. | ............... | 725/38 |

FOREIGN PATENT DOCUMENTS

| | | |
|---|---|---|
| JP | 2001-036844 A | 2/2001 |
| JP | 2003-032643 A | 1/2003 |
| JP | 2004-266690 A | 9/2004 |
| JP | 2005-141614 | 6/2005 |
| JP | 2008-092297 | 4/2008 |

OTHER PUBLICATIONS

Explanation of Non-English Language References.
Notice of Reasons for Rejection mailed by Japan Patent Office on Jan. 19, 2010 in the corresponding Japanese patent application No. 2008-184057.

* cited by examiner

*Primary Examiner* — Tung Vo
(74) *Attorney, Agent, or Firm* — Knobbe, Martens, Olson & Bear LLP

(57) ABSTRACT

According to one embodiment, a video processing apparatus includes a first conversion module configured to execute up-conversion processing on a section of video data, a display module configure to enlarge a moving image of the section of the video data subjected to the up-conversion processing by the first conversion module so as to display a partial area of the image, and a second conversion module configure to execute the up-conversion processing on the entire video data by up-conversion processing corresponding to a selected moving image of the moving images displayed by the display module.

10 Claims, 6 Drawing Sheets

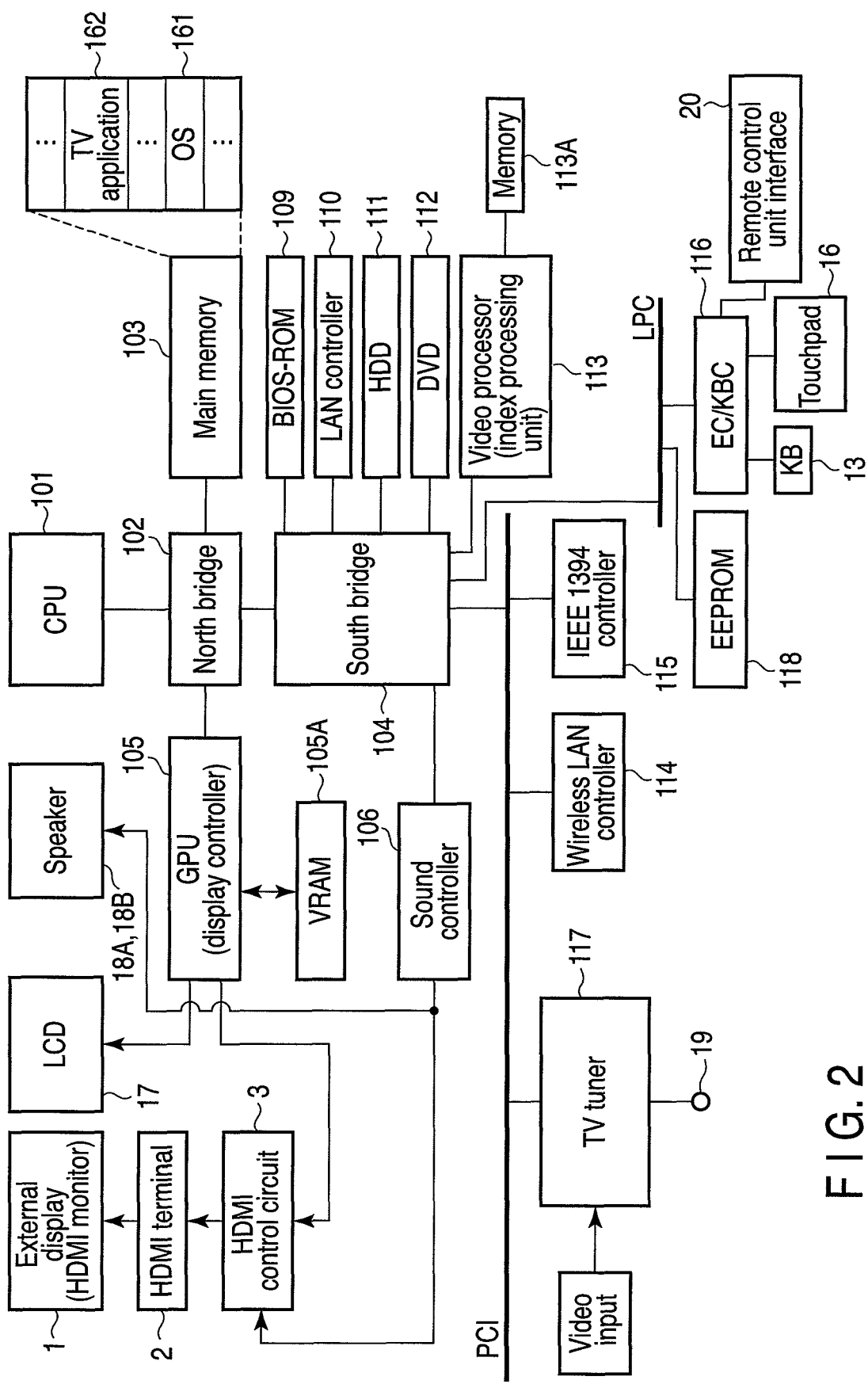
F I G. 2

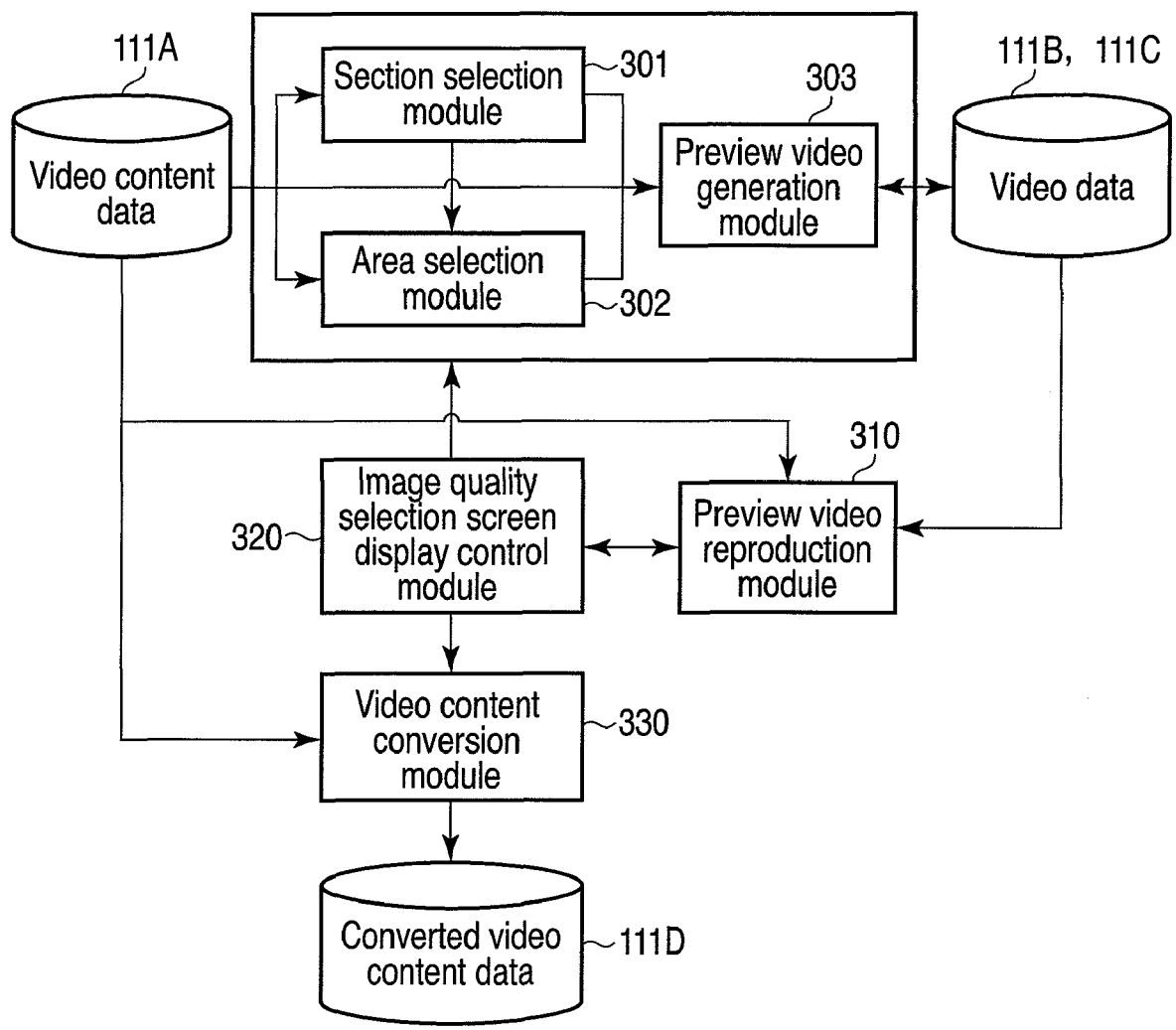
F I G. 8

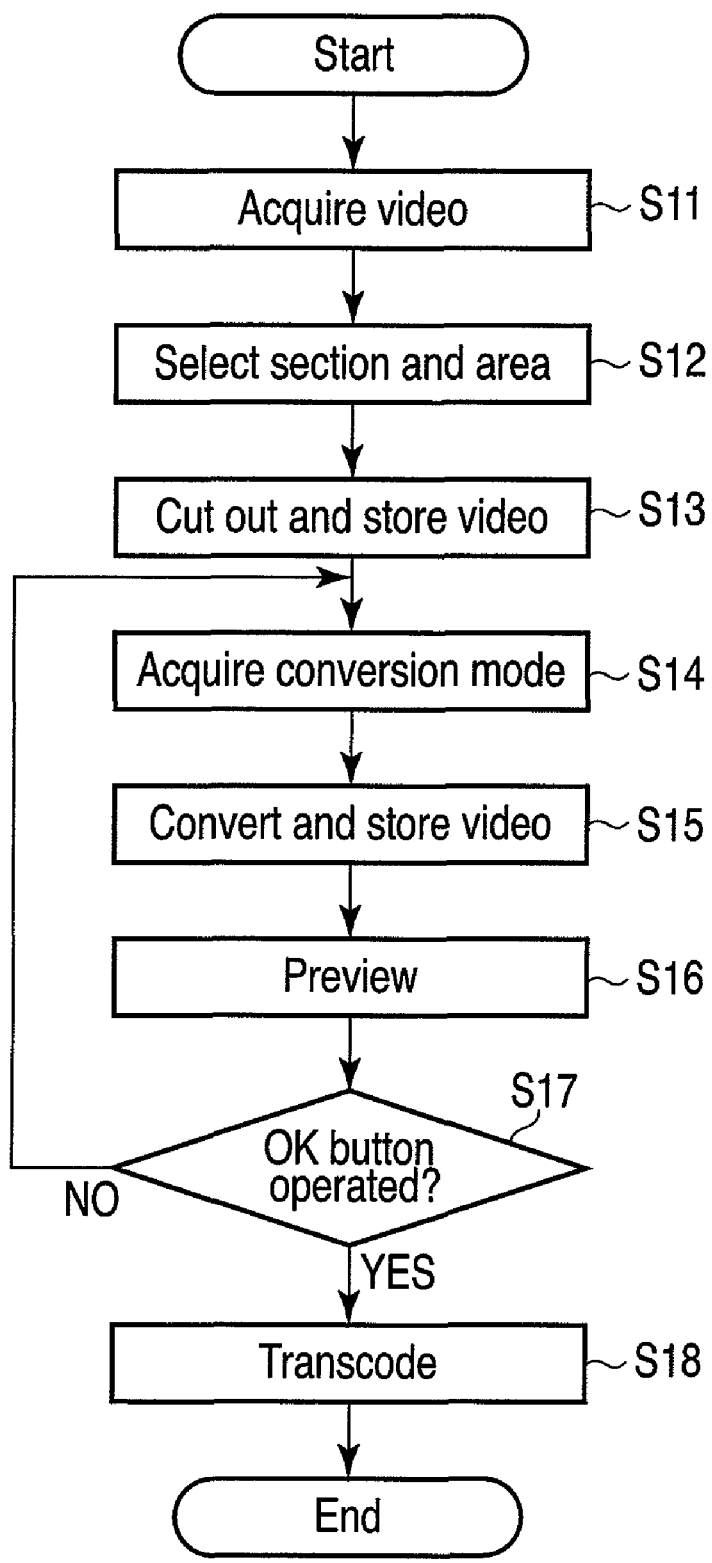
F I G. 9

US 7,929,615 B2

VIDEO PROCESSING APPARATUS

CROSS-REFERENCE TO RELATED APPLICATIONS

This application is based upon and claims the benefit of priority from Japanese Patent Application No. 2008-184057, filed Jul. 15, 2008, the entire contents of which are incorporated herein by reference.

BACKGROUND

1. Field

The present invention relates to a video processing apparatus for transcoding video data.

2. Description of the Related Art

Generally, electronic apparatuses such as video recorders and personal computers can record and reproduce various kinds of video content data such as television broadcast program data.

Note that, Jpn. Pat. Appln. KOKAI Publication No. 2001-36844 has disclosed a technology in which when re-compressing accumulated video stream by means of a transcoder, video stream before the re-compression and video stream after the re-compression are reproduced and displayed side by side on a screen for user to be able to select a desired image quality.

The technology described in the above-mentioned document has such a problem that because original video content is converted, a load of the conversion processing is applied and effects and influences of the conversion are hard to see.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is a block diagram showing an example of the system configuration of the video content processing apparatus of the same embodiment;

FIG. 8 is a block diagram showing the configuration of a transcode processing unit which executes transcode setting processing and transcoding; and FIG. 9 is a flowchart showing the procedure of processing to be carried out by the transcode processing unit shown in FIG. 8.

DETAILED DESCRIPTION

Various embodiments according to the invention will be described hereinafter with reference to the accompanying drawings. In general, according to one embodiment of the invention, a video processing apparatus comprises a first conversion module configured to execute up-conversion processing on a section of video data, a display module configured to enlarge a moving image of the section of the video data subjected to the up-conversion processing by the first conversion module so as to display a partial area of the image, and a second conversion module configured to execute the up-conversion processing on the entire video data by up-conversion processing corresponding to a selected moving image of the moving images displayed by the display module.

Embodiments of the present invention will be described below with reference to the accompanying drawings.

First, the structure of a video processing apparatus according to an embodiment of the present invention will be described with reference to FIGS. 1 and 2. The video processing apparatus of this embodiment is realized with, for example, a notebook type portable personal computer 10 which functions as an information processing device.

This personal computer 10 can record and reproduce video content data (audio-visual content data) such as broadcast program data and video data input from an external device. That is, the personal computer 10 has a function of television (TV) for executing viewing and recording of broadcast program data aired by TV broadcasting signals. This TV function is realized by a TV application program installed in the personal computer 10 preliminarily. The TV function has a function of recording video data input from an external AV device, a function of reproducing recorded video data and recorded broadcast program data and a function of transcoding the recorded video data and recorded broadcast program data.

Figure 1:
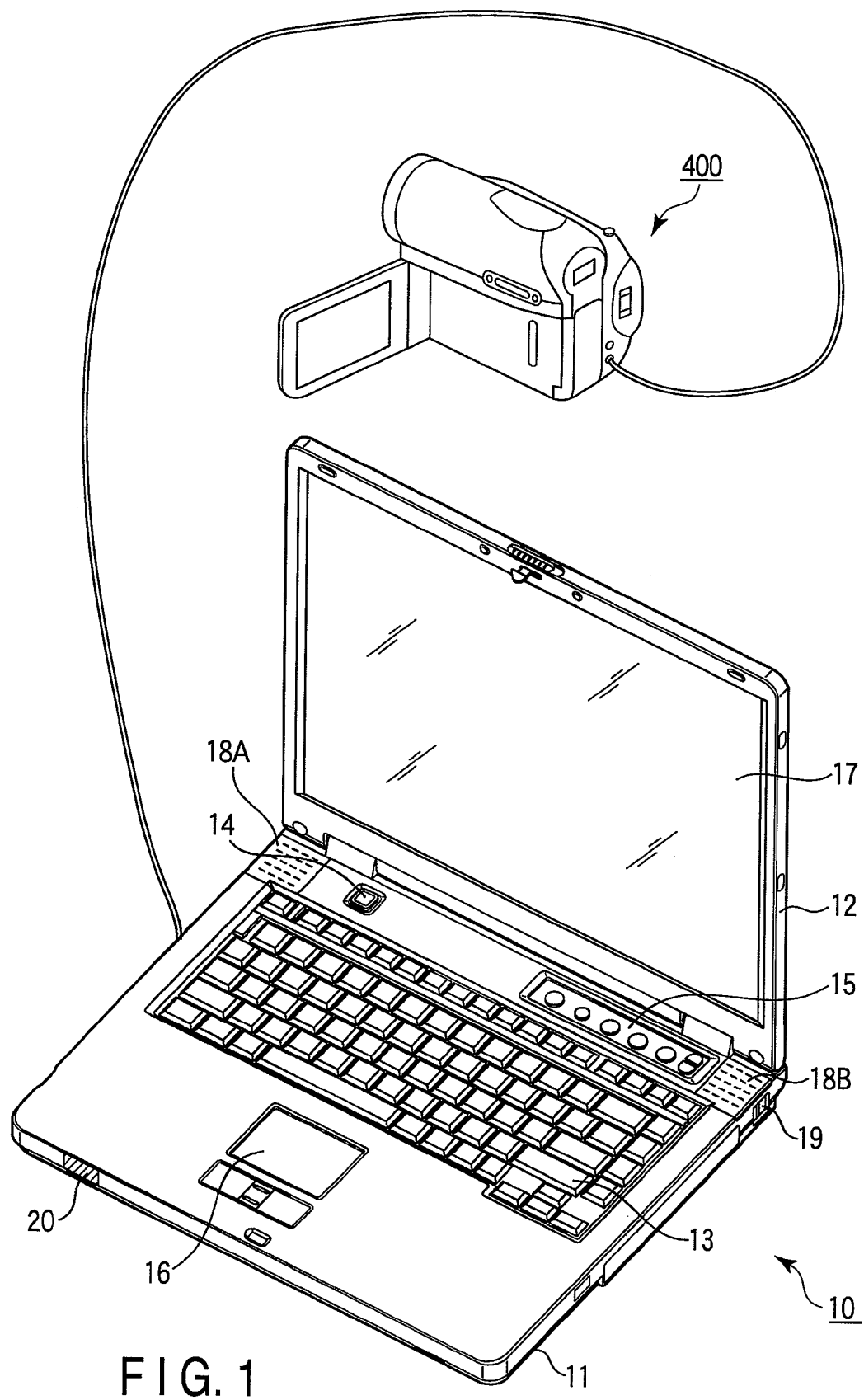
FIG. 1 is a perspective view showing an example of a video content processing apparatus according to an embodiment of the present invention.

FIG. 1 is a perspective view of a state in which the display unit of the computer 10 is opened. This computer 10 is constituted of a computer main body 11 and a display unit 12. The display unit 12 incorporates a display device constituted of a thin-film-transistor liquid crystal display (TFT-LCD) 17.

The display unit 12 is installed to the computer main body 11 so as to be rotated between an open position where the top face of the computer main body 11 is exposed and a closed position where the top face of the computer main body 11 is covered. The computer main body 11 has a thin box-like case and, a keyboard 13, a power button 14 for turning on/off the power of the computer 10, an input control panel 15, a touchpad 16, and speakers 18A, 18B are disposed on the top face thereof.

The input control panel 15 is an input device for inputting an event corresponding to a pressed button and has plural buttons for starting plural functions. This button group includes a control button group for controlling the TV function (viewing, recording, reproduction of recorded broadcast program data/video data). Further, a remote control unit interface unit 20 for executing communication with a remote control unit which remotely controls the TV function of the computer 10 is provided on the front face of the computer main body 11. The remote control unit interface unit 20 includes an infrared ray signal receiving unit and the like.

A TV broadcasting antenna terminal 19 is provided in the right side face of the computer main body 11. An external display connecting terminal conforming to, for example, the High-Definition Multimedia Interface (HDMI) standard is provided in the rear face of the computer main body 11. This external display connecting terminal is used to output video data (moving video data) contained in the video content data such as broadcast program data to an external display. An external device connecting terminal based on the IEEE 1394 standard is provided on the left side face of the computer main body 11. This external device connecting terminal is used to fetch in video data from an external device 400, for example, a camcorder.

Next, the system configuration of the computer 10 will be described with reference to FIG. 2.

As shown in FIG. 2, the computer 10 includes a CPU 101, a north bridge 102, a main memory 103, a south bridge 104, a graphics processing unit (GPU) 105, a video memory (VRAM) 105A, a sound controller 106, a BIOS-ROM 109, a LAN controller 110, a hard disk drive (HDD) 111, a DVD drive 112, a video processor 113, a memory 113A, a wireless LAN controller 114, an IEEE 1394 controller 115, an embedded controller/keyboard controller IC (EC/KBC) 116, a TV tuner 117, an EEPROM 118 and the like.

The CPU 101 is a processor for controlling the operation of the computer 10 and executes an operating system (OS) 161 loaded to the main memory 103 from the hard disk drive (HDD) 111 and various application programs such as a TV application program 162. The TV application program 162 is software for executing a TV function. This TV application program 162 executes live reproduction processing for viewing broadcast program data received by the TV tuner 117, recording processing for recording received broadcast program data in the HDD 111, reproduction processing for reproducing broadcast program data/video data recorded in the HDD 111, transcode processing of broadcast program data/video data stored in the HDD 111 and the like. The TV application program 162 can also transcode broadcast content in real time and record the content in the HDD 111. The CPU 101 executes the basic input/output system (BIOS) which is stored in the BIOS-ROM 109. The BIOS is a program for controlling hardware.

The north bridge 102 is a bridge device for connecting a local bus of the CPU 101 with the south bridge 104. The north bridge 102 contains a memory controller for an access control of the main memory 103. The north bridge 102 has a function for executing communication with the CPU 105 through PCI EXPRESS standard-based serial bus.

The GPU 105 is a display controller for controlling the LCD 17 used as a display monitor of the computer 10. A display signal generated by this GPU 105 is sent to the LCD 17. The GPU 105 can send digital video signals to an external display device 1 through an HDMI control circuit 3 and an HDMI terminal 2.

The HDMI terminal 2 is the above-mentioned external display connecting terminal. The HDMI terminal 2 can send uncompressed digital video signals and digital audio signals to the external display device 1 such as TV through a single cable. The HDMI control circuit 3 is an interface for sending digital video signals to the external display unit 1 called HDMI monitor through the HDMI terminal 2.

The south bridge 104 controls respective devices on a Low Pin Count (LPC) bus and respective devices on a peripheral component interconnect (PCI) bus. The south bridge 104 contains an Integrated Drive Electronics (IDE) controller for controlling the hard disk drive (HDD) 111 and the DVD drive 112. Further, the south bridge 104 has a function of executing communication with the sound controller 106.

The video processor 113 is connected to the south bridge 104 through the PCI EXPRESS standard serial bus.

The video processor 113 is a processor for executing video format conversion processing (transcode), conversion processing (up-conversion processing) and various processes concerning video indexing and audio indexing.

Conversion of a coding system and the up-conversion processing are carried out in the transcode processing. The conversion of the coding system converts, for example, MPEG-2 format video data to a format style such as AVC and the up-conversion processing (super-resolution processing) is processing for achieving the high resolution by, for example, converting SD quality video to HD quality video. By raising the resolution of moving images, a user can enjoy clearer moving images.

In the video index processing, the video processor 113 extracts plural face images from moving image data contained in the video content data and outputs time stamp information and the like indicating a time when each extracted face image appears in the video content data. The extraction of the face image is carried out by, for example, face detection processing of detecting a face area from each frame of the moving image data, processing of cutting out the detected face area from the frame and the like. Detection of the face area can be performed by analyzing features of images of each frame and searching for an area having a feature similar to preliminarily prepared face image feature samples. The face image feature sample is feature data obtained by processing the face image features of a number of people statistically.

The video indexing realizes a face image listing function of displaying a list of face images of persons appearing in video content data such as video data and broadcast program data stored in the personal computer 10. This face image listing function is installed in the TV function as its function. The face image listing function is one of the video indexing functions for presenting an outline and the like of the video content to a user. This face image listing function can present which person appears in which time period of entire video content data. Additionally, this face image listing function can display a list of persons by paying attention to a predetermined attribute section contained in the video content data.

The audio index processing is index processing of analyzing audio data contained in the video content data and detecting a music section in which music is played and a speech section in which a person talks, contained in the video content data. The audio index processing analyzes the feature of the frequency spectrum of, for example, audio data and detects the music section and speech section corresponding to the feature of the frequency spectrum. Because the feature of the frequency spectrum corresponding to the music section is different from the feature of the frequency spectrum corresponding to the speech section, the music section and the speech section can be detected by analyzing the features of their frequency spectrums.

The memory 113A is used as a working memory of the video processor 113. A large number of arithmetic operations are required to execute the index processing (commercial break detection processing, video index processing). In this embodiment, the video processor 113 which is a specialized processor different from the CPU 101 is used as a back end processor and the index processing is executed by this video processor 113. Consequently, the index processing can be executed without inducing an increase of the load on the CPU 101.

The sound controller 106 is a sound source device and outputs audio data to be reproduced to the speakers 18A, 18B or the HDMI control circuit 3.

The wireless LAN controller 114 is a wireless communication device which executes for example, IEEE 802.11 standard-based wireless communication. The IEEE 1394 controller 115 executes communication with the external device 400 connected to the IEEE 1394 connecting terminal through an IEEE 1394 standard serial bus so as to fetch in personal video content data taken and recorded by, for example, a camcorder.

The embedded controller/keyboard controller IC (EC/KBC) 116 is a 1-chip microcomputer in which an embedded controller for power control and a keyboard controller for controlling the keyboard (KB) 13 and the touchpad 16 are stacked. This embedded controller/keyboard controller IC (EC/KBC) 116 has a function of turning on/off the computer 10 according to an operation of the power button 14 by a user. Further, the embedded controller/keyboard controller IC (EC/KBC) has a function of executing communication with the remote control unit interface 20.

The TV tuner 117 is a receiving device for receiving broadcast program data broadcast by television (TV) broadcasting signals and connected to the antenna terminal 19. This TV tuner 117 is realized as a digital TV tuner capable of receiving the digital broadcast program data of digital terrestrial television broadcasting and the like. Further, the TV tuner 117 has a function of capturing video data input from any external device.

Next, the transcode function of the computer 10 will be described. First, a setting screen for executing the transcode will be described with reference to FIG. 3.

Figure 3:
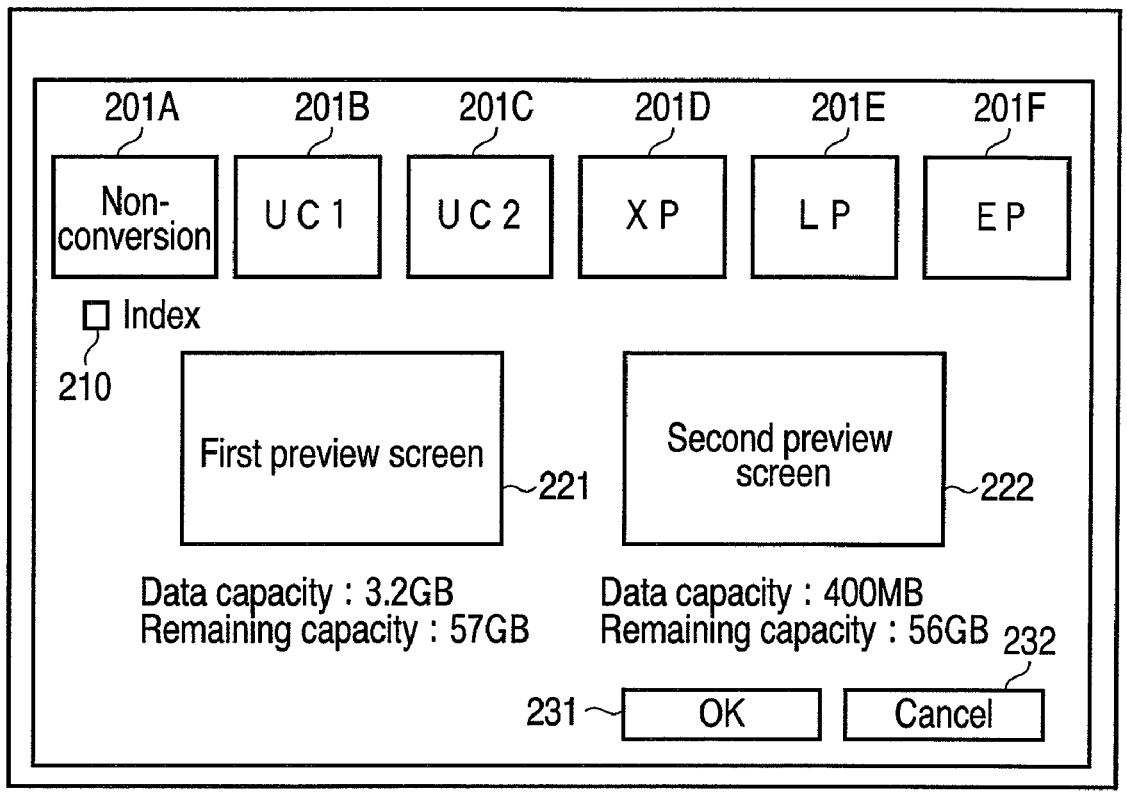
FIG. 3 is a diagram showing an example of a setting screen at the time of transcoding.

As shown in FIG. 3, mode selection buttons such as a non-conversion button 201A, an up-conversion 1 (UC1) button 201B, an up-conversion 2 (UC2) button 201C, an XP button 201D, an LP button 201E, and an EP button 201F, are disposed in line on the top section of the screen. The non-conversion button 201A, the UC1 button 201B, the UC2 button 201C, the XP button 201D, the LP button 201E and the EP button 201F are provided for a user to execute a pseudo pressing operation in order to set up modes (coding method, resolution, bit rate) of the transcode.

The UC1 button 201B is a button for setting the UC1 mode (coding method: H. 264, HD image quality, bit rate 10.0 Mbps) for executing the up-conversion to convert the SD video into the HD video. The UC2 button 201C is a button for setting the UC2 mode (coding method: H. 264, HD image quality, bit rate 10.0 Mbps) for executing the up-conversion to convert the SD video into the HD video. In the meantime, video generated under the UC2 mode has a lower image quality than video generated under the UC1 mode. However, the transcode time of the UC2 mode is shorter than the transcode time of the UC1 mode.

The XP button 201D is a button for setting the XP mode (coding method: H. 264, HD image quality, bit rate 10.0 Mbps). The LP button 201E is a button for setting the LP mode (coding method: H. 264, HD image quality, bit rate 5.5 Mbps). The EP button 201F is a button for setting the EP mode (coding method: H. 264, SD image quality, bit rate 2.0 Mbps).

A check box 210 is disposed below the non-conversion button and characters "indexing" are disposed on the side thereof. By checking the check box 210, various processes concerning the above-described video indexing and audio indexing are carried out.

A first preview screen 221 and a second preview screen 222 are disposed in line further below. Video based on original video content is displayed in the first preview screen 221. A preview screen corresponding to a mode selected by pressing the non-conversion button, the UC1 button, the UC2 button, the XP button, the LP button, or the EP button is displayed in the second preview screen 222.

The capacity of original video content and the remaining capacity of the HDD are displayed below the first preview screen 221. Likewise, the capacity of video content after conversion based on a selected mode and the remaining capacity of the HDD are displayed below the second preview screen 222.

Figure 4:
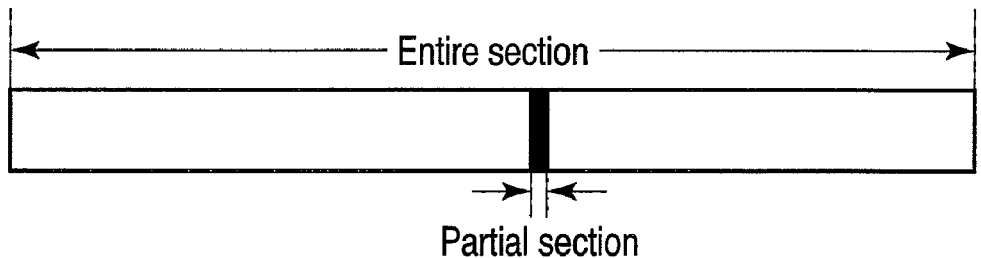
FIG. 4 is a diagram showing an example of the relationship between video content and a selected partial section.
Figure 5:
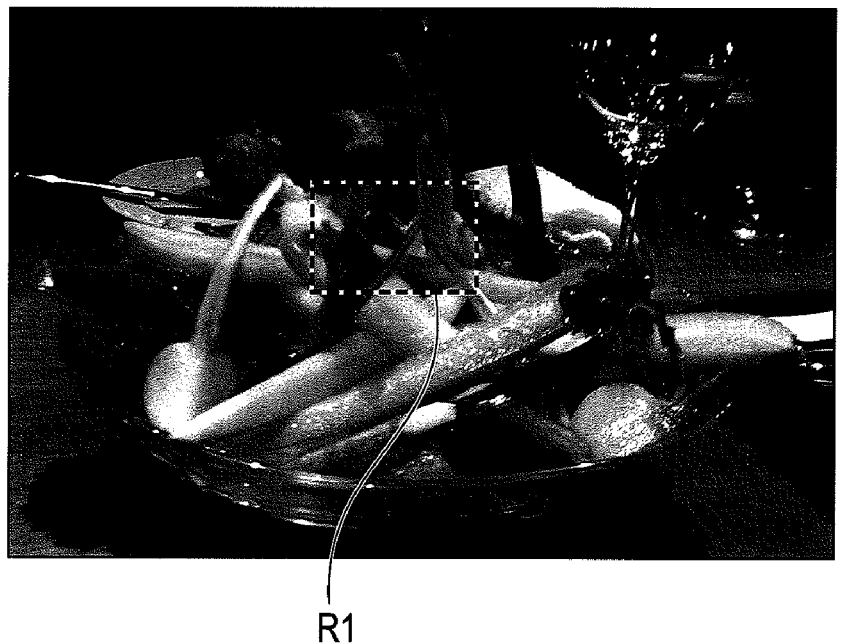
FIG. 5 is an image showing an example of an area cut out from an image of video content.
Figure 6:
FIG. 6 is an image showing an example of the image cut out from the video content shown in FIG. 5.

When a user presses the mode selection buttons 201A to 201F, video data is generated by cutting out a partial area of a partial section (see FIG. 4) selected from the video content by a mode corresponding to any operated button. For example, a partial area of images of each frame is cut out and then video data is generated to display video composed of the cut out images selectively. In the meantime, an area cut out from images of each frame is relatively the same area. FIG. 5 shows an image of a certain frame. Video data is generated containing an image (FIG. 6) in an area R1 cut out from the image shown in FIG. 5. Then, the cut out image is transcoded.

Selection of the partial section from the video content is automatically carried out. The selection of the partial section is carried out using the feature amount (motion vector of MPEG or the like) corresponding to the magnitude of a motion so as to select a section containing video having the smallest motion or a section containing video having the largest motion. In the meantime, the section mentioned here is a period of a predetermined number of seconds, for example, a section of 15 seconds.

To cut out the partial area, the feature amount (AC component of the I picture of MPEG) corresponding to a spatial frequency is used so as to select, for example, an area having many fine portions. The AC component indicates an amount containing the edge. The area size is set to meet the size of the preview screen display considering an enlarged display. For example, an area ⅕ the original one is selected while holding the unit of a macroblock.

Figure 7:
FIG. 7 is an image showing an example of the image displayed on a preview screen.

Video data after transcoding is stored in the HDD 111. Played video after the transcoding is enlarged at a predetermined magnification and displayed on the preview screen. FIG. 7 shows an example of the video displayed on the preview screen. The video shown in FIG. 7 is displayed by enlarging the video shown in FIG. 6 at a 2.5-fold magnification.

In the meantime, the played video may be displayed at an original magnification without being enlarged.

Next, a module for executing the above-described processing actually will be described. FIG. 8 is a block diagram showing the configuration of a transcode processing unit which executes transcode setting processing and transcoding.

As shown in FIG. 8, the transcode processing unit includes a section selection module 301, an area selection module 302, a preview video generation module 303, an image quality selection screen display control module 320, a preview video reproduction module 310, a video content conversion module 330 and the like.

The section selection module 301 selects a partial section to be previewed from video content data using the above-mentioned method. The area selection module 302 sets a partial area to be cut out from video displayed by video data in a section selected by the section selection module 301.

The preview video generation module 303 generates video data corresponding to the section and area selected by the section selection module 301 and the area selection module 302 from the video content data and stores the data in the HDD 111 as original video data 111B. The preview video generation module 303 converts the original video data 111B according to a mode selected by a user from the setting screen shown in FIG. 3 and stores the converted video data in the HDD 111 as converted video data 111C. Generation of the original video data 111B and conversion of the original video data 111B are carried out by the video processor 113.

When the moving image conversion processing is carried out by bit rate specification, the bit rate at the time of moving image processing of a cut out area is preferably changed according to a ratio between the original video and the cut out video. That is, the bit rate contained in a mode corresponding to a pressed button is changed to the size (vertical pixels× horizontal pixels) of a moving image of the video content data and the size (bit rate corresponding to a ratio between the vertical pixels and the horizontal pixels) of video data after conversion, and the converted video data is generated using the changed bit rate. For example, if the selected conversion mode is 8 Mbps and the ratio between the original video and video to be cut out is 1/16, the video data is converted at 0.5 Mbps which is 1/16 of 8 Mbps.

The image quality selection screen display control module 320 displays the setting screen shown in FIG. 3. Further, the image quality selection screen display control module 320 controls the section selection module 301, the area selection module 302, the preview video generation module 303, and the preview video reproduction module 310.

The preview video reproduction module 310 reproduces the original video data 111B and converted video data synchronously. Upon reproduction, reproduced video is generated by enlarging the video at a predetermined magnification.

The image quality selection screen display control module 320 displays a moving image reproduced by the preview video reproduction module 310 on the first preview screen and second preview screen shown in FIG. 3.

The video content conversion module 330 transcodes the video content data 111A according to a conversion mode selected by a user and stores the video data after transcoding in the HDD 111 as the converted video content data 111D. The transcoding is carried out by the video processor 113.

Next, the setting procedure will be described with reference to the flowchart of FIG. 9.

First, the image quality selection screen display control module 320 acquires a path (storage position) of the video content data 111A to be transcoded (step S11). The image quality selection screen display control module 320 acquires a path of the video content data 111A by detecting the path of the video content data 111A selected by a user using a dialog box or the like.

Subsequently, to display preview video from the video content data 111A, a section is selected and an area of video in the selected section is selected (step S12). The image quality selection screen display control module 320 transfers the acquired path to the section selection module 301 and instructs to select a section. After the section is selected, the section selection module 301 transfers the path and section of the video content data 111A to the area selection module 302 and instructs to select an area. After the area is selected, the area selection module 302 transferes the path, selected section and cut-out area of the video content data 111A to the preview video generation module 303 and instructs to generate the original video data 111B.

The preview video generation module 303 generates the original video data 111B corresponding to the transferred path, selected section and cut-out area and stores the original video data 111B in the HDD 111 (step S13). If the video format is a compression format, video is deteriorated. Thus, it is preferable to record the original video data 111B in the uncompressed video format.

Subsequently, the image quality selection screen display control module 320 monitors a user's operation. If it is detected that the user operates any mode selection button, the image quality selection screen display control module 320 acquires a conversion mode corresponding to the operated mode selection button (step S14). The image quality selection screen display control module 320 sends the content (video format, resolution, bit rate) of a mode corresponding to that button and an instruction about conversion processing to the preview video generation module 303.

The preview video generation module 303 generates the converted video data 111C by converting the original video data 111B according to the content of an acquired mode and stores the converted video data 111C in the HDD 111 (step S15).

Then, the image quality selection screen display control module 320 instructs the preview video reproduction module 310 to reproduce the original video data 111B and the converted video data 111C. The preview video reproduction module 310 reproduces the original video data 111B and the converted video data 111C synchronously. Then, moving image data played by enlarging the original video data 111B and the converted video data 111C at the same magnification is transferred to the image quality selection screen display control module 320. In the setting screen shown in FIG. 3, the image quality selection screen display control module 320 displays enlarged reproduced video of the original video data 111B on the first preview screen 221 and enlarged reproduced video of the converted video data 111C on the second preview screen 222.

The image quality selection screen display control module 320 monitors a user's operation. When a user operates any mode selection button (No in step S17), steps S14 and S15 are executed successively. If the operation of the OK button is detected (Yes in step S17), the image quality selection screen display control module 320 transferes the paths of the conversion mode and video content data 111A acquired in step S14 to the video content conversion module 330.

The video content conversion module 330 transcodes the video content data 111A corresponding to the transferred path to meet the conversion mode (step S18). In the meantime, if the check box 210 of FIG. 3 is checked, the index processing is carried out with transcoding. After the transcoding, the video content conversion module 330 stores any converted data in the HDD 111 as the converted video content data 111D. The transcode processing is thus ended.

By setting the section and area as small as possible, the load of the conversion can be reduced, so that, for example, super-resolution data (high-definition data), which cannot be treated in real time, can be taken as a preview object. Further, by automatically selecting a smaller section and area and then enlarging their processed moving image, effects and influences of the conversion can be displayed clearly (moving image having a large motion or images having no fine units are difficult to see).

In the above description, the example of using the transcode for the video content data stored in the HDD 111 has been described. If a user wants to record video which he or she is viewing while the video is being converted, the user selects processing video for displaying preview video from the video being viewed currently in setting for conversion of the recorded video.

In the setting for a case where no object video exists like scheduled recording, further video content is selected as the processing video for displaying the preview video. In the case of broadcast content which is recorded every week, for example, the processing video for displaying the preview video is selected from previous broadcast content recorded previously. Alternatively, the processing video for displaying the preview video is selected from broadcasting of the same genre.

Although in the above embodiment, the example of reproducing a specific section as the preview screen has been described, it is permissible to select a certain frame and display it as a still image. Further, it is permissible to present plural sections, plural areas and plural frames in combination.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video processing apparatus comprising:
   a first convertor configured to up-convert a segment of video data;
   a display configured to enlarge an image of the segment of the video data after the up-conversion by the first convertor and to display a partial area of the image; and
   a second convertor configured to up-convert the entire video data by the up-conversion related to a selected image of the images displayed by the display.

2. The video processing apparatus of claim 1, wherein the display is configured to display an image of original video data before the up-conversion and an image of the video data after the up-conversion by the first convertor such that the images are compared with each other.

3. The video processing apparatus of claim 1, wherein the first convertor and the second convertor are configured to execute two or more up-conversions, and the display is configured to display images of the video data after the two or more up-conversions such that the images are compared with each other.

4. The video processing apparatus of claim 3, further comprising a segment selector configured to select a partial segment to be up-converted,
   wherein the display is configured to display an image obtained by playing the video data in the partial segment selected by the segment selector.

5. The video processing apparatus of claim 4, wherein the segment selector is configured to select the partial segment by referring to a feature corresponding to the size of a motion of the video data in the video.

6. The video processing apparatus of claim 5, wherein the feature is a motion vector.

7. The video processing apparatus of claim 3, wherein the display is configured to display plural images obtained by playing the video data in the partial segment selected by the segment selector such that the plural images are compared with each other, and the playback of the plural images are synchronized.

8. The video processing apparatus of claim 7, wherein the display is configured to display plural images obtained by playing the video data in the partial segment selected by the section selector such that the plural image are compared with each other, using the same enlargement method in displaying the plural moving images.

9. The video processing apparatus of claim 3, further comprising an area selector configured to select the partial area displayed by the display,
   wherein the display is configured to display an image of the selected partial area.

10. The video processing apparatus of claim 9, wherein the area selector is configured to select the partial area by referring to a feature corresponding to a spatial frequency in the video data.

* * * * *